United States Patent [19]

Krockta

[11] 4,047,910
[45] Sept. 13, 1977

[54] APPARATUS FOR COLLECTING FINE PARTICLES

[75] Inventor: Harry Krockta, E. Northport, N.Y.

[73] Assignee: The Ducon Company, Inc., Mineola, N.Y.

[21] Appl. No.: 688,801

[22] Filed: May 21, 1976

[51] Int. Cl.² .................................................. B01D 47/10
[52] U.S. Cl. ............................................. 55/235; 55/92
[58] Field of Search ..................... 55/1, 92, 97, 459 R, 55/235–238

[56] References Cited

U.S. PATENT DOCUMENTS

| | | | |
|---|---|---|---|
| 2,811,222 | 10/1957 | Leech | 55/223 |
| 3,883,324 | 5/1975 | Balla et al. | 55/1 |

Primary Examiner—Bernard Nozick
Attorney, Agent, or Firm—Seidel, Gonda & Goldhammer

[57] ABSTRACT

The dust collector includes an upright elongated cylindrical gas scrubber having a tangential gas inlet for dust laden gas and a duct having its entrance and exit connected to the scrubber above said inlet. The duct includes a dynamic separation and impelling means. Between the duct entrance and said impelling means, there is provided a restriction to gas flow, such as an orifice plate, for substantially reducing the cross sectional area of the duct by an amount sufficient to create turbulence in the duct.

2 Claims, 2 Drawing Figures

APPARATUS FOR COLLECTING FINE PARTICLES

BACKGROUND

The present invention is an improvement over the apparatus and method disclosed in U.S. Pat. No. 2,811,222. The problem with respect to air pollution has become more severe since the device in said patent was first put into operation. Recent changes in the requirements of regulatory agencies have required more stringent controls on removal of dust particles from gas streams before the streams are discharged into the atmosphere.

I have found that substantial improvements in efficiency can be attained over the apparatus and method of said patent by only minor modifications.

SUMMARY OF THE INVENTION

The apparatus of the present invention is directed to a dust collector which includes an upright elongated generally cylndrical scrubber. Dust laden gas enters the scrubber by way of a tangential inlet in the bottom portion of the scrubber. Radially extending baffle means is provided within the scrubber above the inlet. The baffle means includes inclined vanes for imparting a rotary motion to the gas introduced by way of the inlet.

A duct is provided with its entrance and exit communicating with said scrubber above the elevation of said inlet. The duct includes an entrance at an elevation above the elevation of said inlet. The exit from said duct communicates with said scrubber at an elevation above the elevation of said duct entrance. The duct contains a dynamic separation and impelling means in the form of a rapidly rotating fan. A restriction, such as an orifice plate, reduces the cross sectional area of the duct by a substantial amount to create turbulence in the duct upstream of said impelling means. The provision of the orifice plate materially increases the efficiency of the dust collector apparatus.

It is an object of the present invention to provide dust collector apparatus which is more efficient than the prior art by a means which is simple, inexpensive and reliable.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
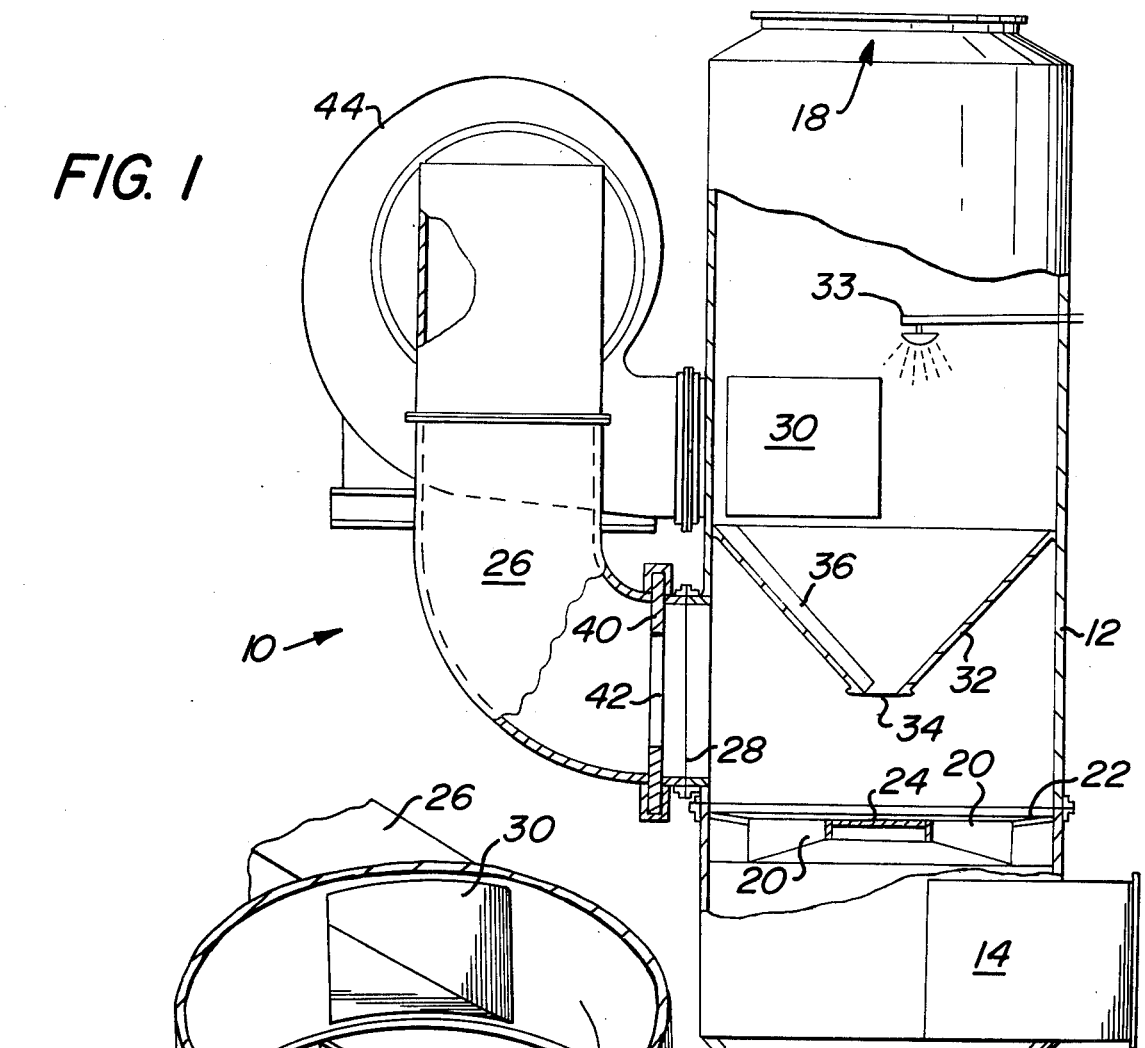
FIG. 1 is a vertical sectional view of the apparatus in accordance with the present invention.
Figure 2:
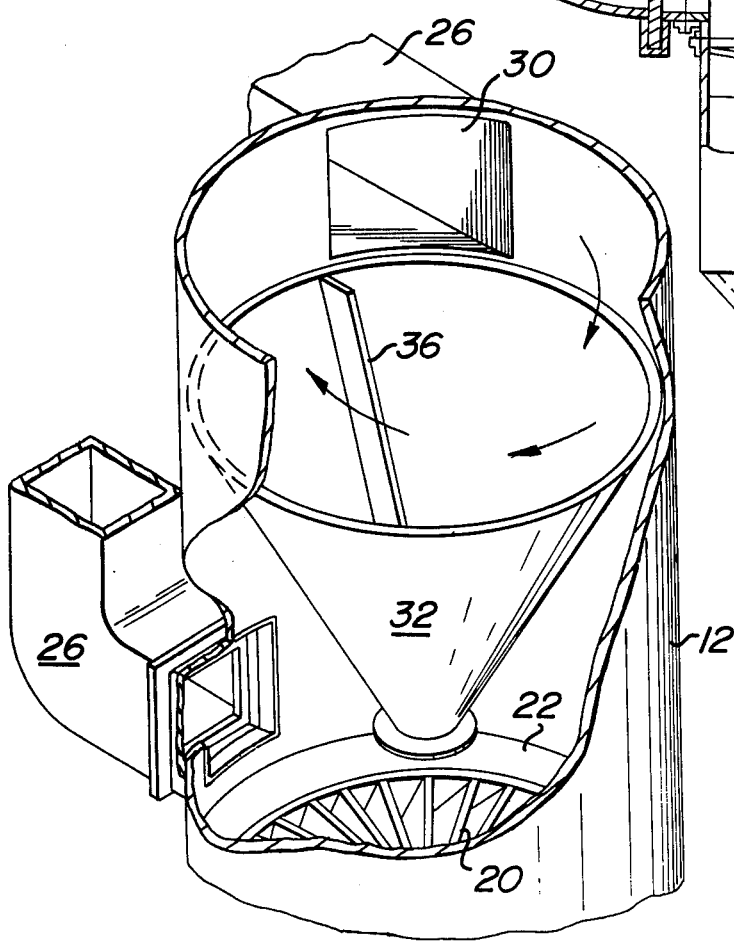
FIG. 2 is a partial perspective view, broken away for purposes of illustration.

Referring to the drawing in detail, wherein like numerals indicate like elements, there is illustrated a dust collector apparatus in accordance with the present invention designated generally as 10. The apparatus 10 includes an upright generally cylindrical scrubber 12 in which are located the precleaning and final separator stages as will be fully explained below. The scrubber 12 includes an inverted truncated conical sludge outlet portion 16 below a tangential inlet 14 for the dust laden gas. The scrubber 12 has a clean gas outlet portion 18 at its upper end.

Positioned within the scrubber 12 at an elevation above the elevation of the inlet 14, there is provided a plurality of radially arranged vanes 20 which are inclined to the vertical and joined at their outer extremities by an annular flange 22. The outer periphery of flange 22 is secured to the inner periphery of scrubber 12. At their inner ends, the vanes 20 are connected to a hub 24. Hub 24 serves to prevent the formation of a vortex and controls the screw-like motion of the rising gas stream within the scrubber 12.

A duct 26 has its entrance 28 in direct communication with the interior of the scrubber 12 at an elevation above the elevation of the vanes 20. The duct 26 has its exit 30 communicating with the interior of the scrubber 12 at an elevation above the elevation of the entrance 28 while being tangentially arranged with respect to the scrubber 12. An inverted truncated cone 32 is provided within the scrubber 12. The upper end of the cone 32 is connected to the inner periphery of the scrubber 12 at an elevation between the elevations of the entrance 28 and exit 30 of the duct 26. An axially disposed opening 34 of the cone 32 is provided. Cone 32 has a radially outwardly extending baffle 36 on its upper surface.

Adjacent the entrance 28, the duct 26 is provided with a restriction, such as plate 40, arranged so as to be perpendicular to the direction of flow through the adjacent portion of the duct 26. Duct 26 is otherwise of uniform cross section. The opening 42 in the orifice plate 40 has a cross sectional area varying from about 30 to 60% of the cross sectional area of the duct 26.

The duct 26 is provided with a dynamic separation and impelling means including fan housing 44 having a rotating means such as a paddle wheel fan as disclosed in the above-mentioned patent. The inlet of the fan housing 44 communicates with that portion of the duct 26 containing the entrance 28 and the outlet of fan housing 44 communicates with that portion of duct 26 containing the exit 30.

The operation of the apparatus 10 is as follows.

Dust laden gas tangentially enters the scrubber 12 by way of inlet 14. The tangential direction of the inlet 14 causes the dust laden gas to move spirally upwardly through the scrubber 12. The vanes 20 are set at an angle to the longitudinal axis of the scrubber 12 in the direction to which the rotating column of gas passes so that the inclination of the vanes 20 tends to maintain the whirling motion of the gas column and at the same time distribute the gas around the periphery of the scrubber 12 as it proceeds upwardly.

The spirally upward motion of the dust laden gas effects an appreciable centrifugal force upon the dust particles carried by the gas stream. Due to the centrifugal force on such particles, there is an impingement on the wet inner surface of the scrubber 12 as well as impingement by the particles on the wet vanes 20. The upwardly moving gas stream contacts downwardly moving liquid from cone 32, which may be sprayed into the scrubber 12 by a conventional spray 33 and then flows radially outwardly from the scrubber 12 through the entrance 28 of the duct 26 carrying entrained liquid from cone 32.

At the orifice plate 40, the gas stream and entrained liquid, such as water from the cone 32 are subjected to the substantial amount of turbulence. The change in pressure across the orifice plate 40 is preferably about 2-6 inches water gauge minimum. There is substantial agglomeration of particles due to the turbulence resulting from a gas velocity at this point of at least about 100 feet per second. The wash liquid is atomized at the orifice plate 40 as the dust laden gas stream and liquid flow through the orifice 42 to the impeller within the fan housing 44. Within the fan housing 44, there is additional liquid atomization and separation of particles is effected by the dynamic action of the fan. From the fan housing 44, the mixture of gas, suspended particulate matter and atomized liquid is impelled tangentially into the interior of the scrubber 12 where it separates centrifugally into a clean gas stream which discharges through outlet opening 18 and the particles and liquid discharge through the port 34 and flow downwardly to the conical outlet portion 16. The baffle 36 assists in interrupting the flow of water and particles in a circumferential direction within the cone 32. A baffle 38 also assists in interrupting the flow of water and particles in a circumferential direction within the portion 16.

The following chart compares the apparatus as disclosed in the above-mentioned patent with the present invention wherein the water rate to the scrubber during test was 240 gallons per minute and the product being processed in the kiln was fine shale rock screenings.

| OPERATING CONDITIONS DURING TEST | | | |
|---|---|---|---|
| Test No. | 1-1 | 1-2 | 1-3 |
| Scrubber | | | |
| Outlet Volume SCFM | 37,138 | 34,188 | 35,287 |
| Temperature ° F Sat. | 150 | 150 | 150 |
| Orifice ΔP "WG | 2.4 | 2.3 | 2.4 |
| Inlet S.P. "WG | −1.9 | −2.0 | −1.9 |
| Kiln Temp. ° F | 2,100 | 2,100 | 2,100 |
| Kiln Feed Rate | 36 T.P.H | 36 T.P.H. | 36 T.P.H. |
| Kiln Fuel | Gas | Gas | Gas |
| Fuel Rate | 83,000 CFH | 83,000 CFH | 83,000 CFH |

| SCRUBBER OUTLET | | | |
|---|---|---|---|
| | Volume SCFM | | Temperature F |
| Test No. | Prior Art | This Apparatus | Prior Art | This Apparatus |
| 1-1 | 34,219 | 37,138 | 157 | 150 |
| 1-2 | 34,365 | 34,188 | 161 | 150 |
| 1-3 | 34,935 | 35,287 | 160 | 150 |
| Average | 34,506 | 35,538 | 159 | 150 |

| STACK LOSSES | | | |
|---|---|---|---|
| | Grains/DSCF | | Pounds/Hour |
| Test No. | Prior Art | This Apparatus | Prior Art | This Apparatus |
| 1-1 | 0.0452 | 0.0224 | 13.30 | 7.15 |
| 1-2 | 0.0616 | 0.0272 | 18.21 | 7.97 |
| 1-3 | 0.0869 | 0.0273 | 17.64 | 8.27 |
| Average | 0.0646 | 0.0256 | 16.38 | 7.80 |

From the above comparison tests, it will be noted that the present invention reduced the stack losses from an average of 16.38 pounds per hour to an average of 7.8 pounds per hour. Also, it will be noted that the outlet emission level was reduced from an average of 0.0646 grains/DSCF to an average of 0.0256 grains/DSCF. The emission loss of 0.0256 grains/DSCF is well below an allowable emission level of 0.04 grains/DSCF.

Thus, the simple, inexpensive and reliable orifice plate 40 located at the entrance of the fan inlet duct 26 produced a significant reduction in stack losses. In order to attain the pressure drop of 2 to 6 inches water gauge at the orifice plate 40, it was necessary to run the fan at a speed of 500-1500 rpm greater than that normally used in the apparatus of the above-mentioned patent. The increased fan tip speed necessitated by the development of additional static pressure at the orifice plate 40 resulted in greater overall turbulence in the fan stage and finer atomization of scrubbing liquid. The combined effect of increased turbulence in the vincinity of the orifice plate 40 and in the fan housing 44 resulted in increased collection efficiency for the apparatus 10 of the present invention. The orifice plate 40 is simple, inexpensive and reliable while unexpectedly increasing the efficiency of the apparatus of the present invention as compared with the apparatus in said prior art patent.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for collecting fine particles from a gas stream including an upright elongated generally cylindrical scrubber having a means for introducing a scrubbing liquid, a tangential gas inlet for dust laden gas in the bottom portion of said scrubber, radially extending baffle means at an elevation in said scrubber above the elevation of said gas inlet, said baffle means including a plurality of inclined vanes forming passageways for imparting rotary motion to gas introduced through said gas inlet, a duct having its entrance and exit communicating with said scrubber, said duct entrance being above the elevation of said vanes, said duct exit being at an elevation above the elevation of said duct entrance, dynamic separation and impelling means in said duct including a rapidly rotating means an orifice plate in said duct for reducing the cross-sectional area of said duct by a substantial amount to create turbulence and improved contact between said scrubbing liquid and said particles in said duct upstream of said impelling means, said duct being of uniform cross section between said plate and said impelling means, and said scrubber having a clean gas outlet above the elevation of said duct exit.

2. Apparatus in accordance with claim 1 wherein said orifice plate has an opening whose cross sectional area is between 30 and 60% of the cross sectional area of said duct, said orifice plate being adjacent to said duct entrance.

* * * * *